Nov. 19, 1963 W. E. STUPAR 3,111,660

ANALOGUE-TO-DIGITAL CONVERTER

Filed Nov. 8, 1957 5 Sheets-Sheet 1

INVENTOR.
WESLEY E. STUPAR

BY [signature]

ATTORNEY

INVENTOR.
WESLEY E. STUPAR
BY [signature]
ATTORNEY

FIG. 2
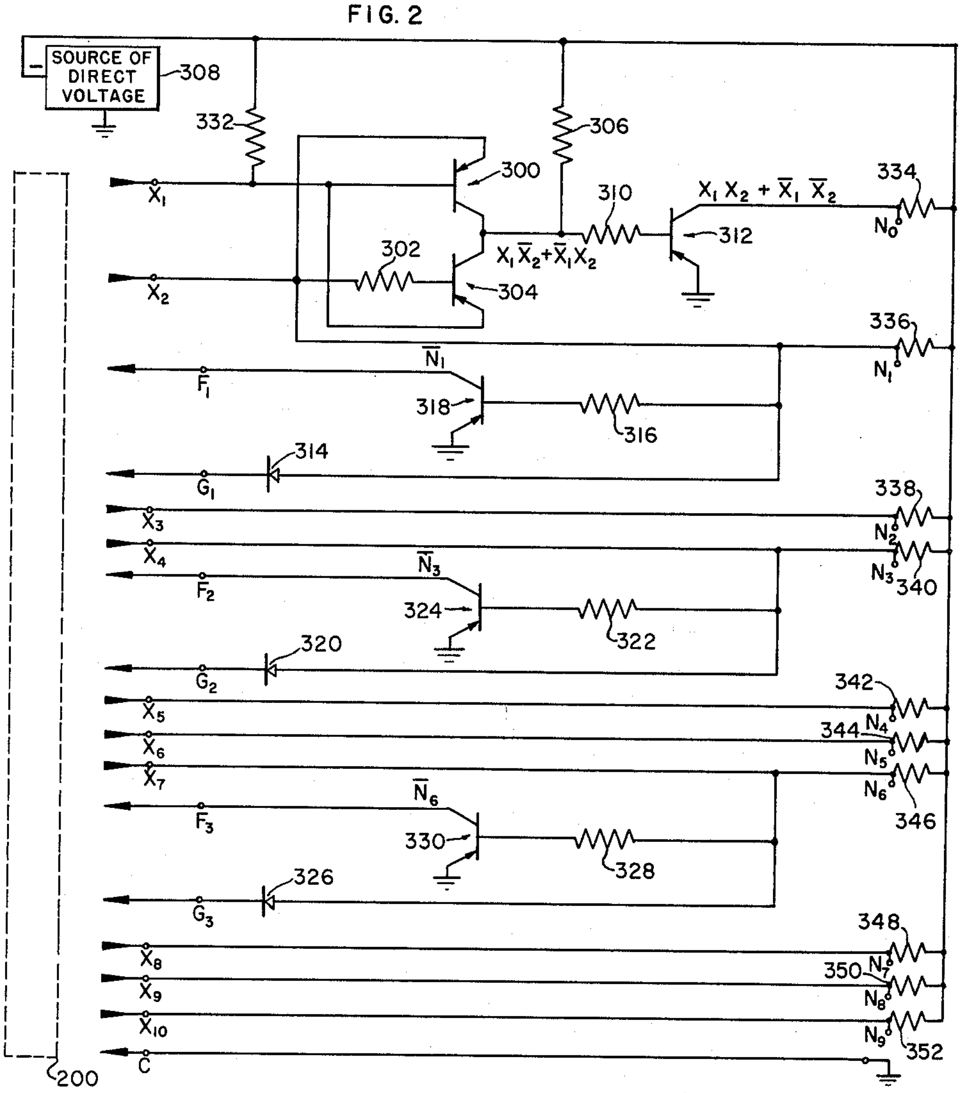
FIG. 3
| TRACK NO. | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| BRUSH NO. | $X_1$ | $X_2$ | $G_1$ | $X_3$ | $X_4$ | $F_1$ | $G_2$ | $X_5$ | $X_6$ | $X_7$ | $F_2$ | $G_3$ | $X_8$ | $X_9$ | $X_{10}$ | $F_3$ | C |
FIG. 4
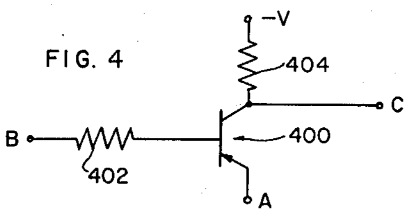
INVENTOR.
WESLEY E. STUPAR
BY [signature]
ATTORNEY Nov. 19, 1963 W. E. STUPAR 3,111,660

ANALOGUE-TO-DIGITAL CONVERTER

Filed Nov. 8, 1957 5 Sheets-Sheet 4

INVENTOR.
WESLEY E. STUPAR
BY [signature]
ATTORNEY

Nov. 19, 1963 W. E. STUPAR 3,111,660

ANALOGUE-TO-DIGITAL CONVERTER

Filed Nov. 8, 1957

5 Sheets-Sheet 5

INVENTOR.
WESLEY E. STUPAR

BY [signature]

ATTORNEY

United States Patent Office 3,111,660 Patented Nov. 19, 1963

3,111,660
ANALOGUE-TO-DIGITAL CONVERTER

Wesley E. Stupar, Burbank, Calif., assignor to General Precision, Inc., a corporation of Delaware Filed Nov. 8, 1957, Ser. No. 699,879
10 Claims. (Cl. 340—347)

The present invention is directed to analogue-to digital converters. The invention is more particularly concerned with an improved converter of the rotating-digitizing disk type for producing digital signals corresponding to analogue quantities such as the angular position of a rotating shaft at any particular instant.

Digital computers and digital data recorders are known to be extremely accurate and to possess a high degree of precision as compared with the analogue type. However, before digital computations and recordings can be made, it is apparent that values represented in analogue form must be converted into digital representations. For example, the rotary movements of a shaft must often be converted into a digital form. Apparatus is known for making such analogue-to-digital conversions. This apparatus is generally referred to as an analogue-to-digital converter.

Mechanical and production difficulties have been encountered, however, in the fabrication of analogue-to-digital converters. The converters of the early prior art utilized mechanical switches and a relatively large number of extraneous mechanical components for actuating the switches. Such prior art converters were unduly large and were wasteful of space. Also, these prior art converters were relatively expensive. Another inherent disadvantage in the prior art converters was the finite response time required by the mechanical switches used in them. This limited the speed of the digital computers to which they were coupled below the speeds which such computers were normally capable of achieving.

More recent analogue-to-digital converters have been formed from a rotatable disk commutator. A plurality of electrically conductive segments are mounted on at least one of the surfaces of the disk. These segments are arranged in a binary pattern in concentric tracks or rows of different ordinal significance. It is usual for the track of the least significant binary bit to be at the rim of the disk, and for the track of the most significant binary bit to be disposed near its annular center. This prior art type of converter also includes a plurality of electrically conductive resilient brushes which respectively contact the conductive segments in the various tracks. The analogue quantity represented by the angular position of the commutator disk at any instant is converted to a binary number corresponding to that quantity, this conversion resulting from the selective engagement of the respective brushes with the conductive segments in the various concentric tracks.

The present invention is directed to an analogue-to-digital converter of the type described in the preceding paragraph. That is, the embodiment of the invention to be described is a brush-contact type of angular shaft position digitizer. A single commutator disk is used in the embodiment of the invention illustrated to control the activation of different brushes riding on the conductive segments on the disk; however, it is to be understood that multiple discs could be used if desired. The construction of the converter is such that the respective potentials on the brushes at any particular instant corresponds to a multi-digit binary number representing the angular position of a shaft to which the commutator disk is connected.

One of the problems encountered in the prior art commutator converters has been that of avoiding reading ambiguities. Because of mechanical imperfections, the condition can arise in many of the prior art disk type of converters where a particular brush engages a conductive segment in its particular track when it should be engaging a non-conductive segment, and vice versa. These ambiguities occur in the various tracks at the transition points between conductive and non-conductive segments. It is important for a transition in a track of a binary bit of any particular significance to occur at the same instant as a transition in the track relating to the least significant bit. An example showing the state of the prior art is given in the patent to L. L. Wolman, No. 2,977,582, issued March 28, 1961.

For a desired binary bit resolution in many present day applications of analogue-to-digital computers, therefore, the required disk size becomes unwieldy and impractical. For example, a 7-inch diameter disk might be required in prior art system for a 10-bit (1024 count per turn) converter in order that the least significant row or track may provide the proper size of its conductive segments and the proper spacing between them. For most applications, however, practical space requirements are such that the disk diameters should not exceed more than 3 or 4 inches.

In accordance with the present invention, the track of the least significance and binary bit, and the track of the next-to-least significant bit on the disk are replaced by two tracks, each having half the required resolution of the least significant track in the prior art disks. These two tracks of the disk of the present invention are staggered by one-half a segment space with respect to each other. Then, a logical combination of brush signals is provided to yield digital signals of the required resolution with a disk that is a fraction of the diameter required for prior art units to provide that resolution. For example, the commutator disk of the present invention is capable of providing a ten-bit, 1024 count-per-turn resolution with a disk diameter of 3½ inches.

In the drawings:

FIGURE 2 is a circuit diagram showing the parallel readout connections from the brushes which engage the various reading tracks of the disk of FIGURE 1 to the output terminals of the system, this circuit diagram also showing various control connections for a plurality of auxiliary brushes which engage feeding tracks on the disk and whose function will be described;

FIGURE 3 is a table illustrating the relationship between various electrical contact brushes referred to in a subsequent circuit diagram and the concentric tracks of the disk of FIGURE 1 with which they are respectively associated;

FIGURE 4 is a fragmentary circuit diagram of a transistor circuit which forms the basis for a control function for the converter of the invention;

FIGURE 4A is a fragmentary detailed view on a large scale illustrating a portion of the disk shown in FIGURE 4;

Figure 1:
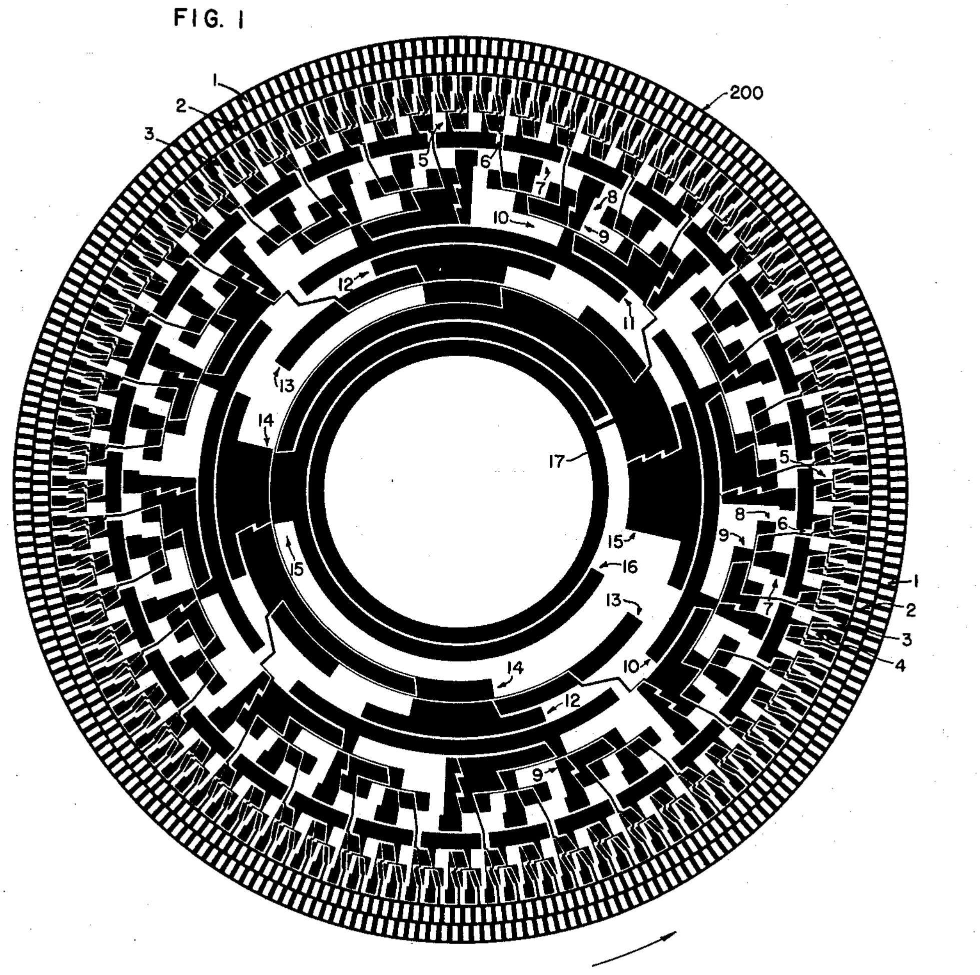
FIGURE 1 is a diagram schematically illustrating certain portions of a rotatable digitizing commutator disk, which forms one embodiment of the present invention.
Figure 1A:
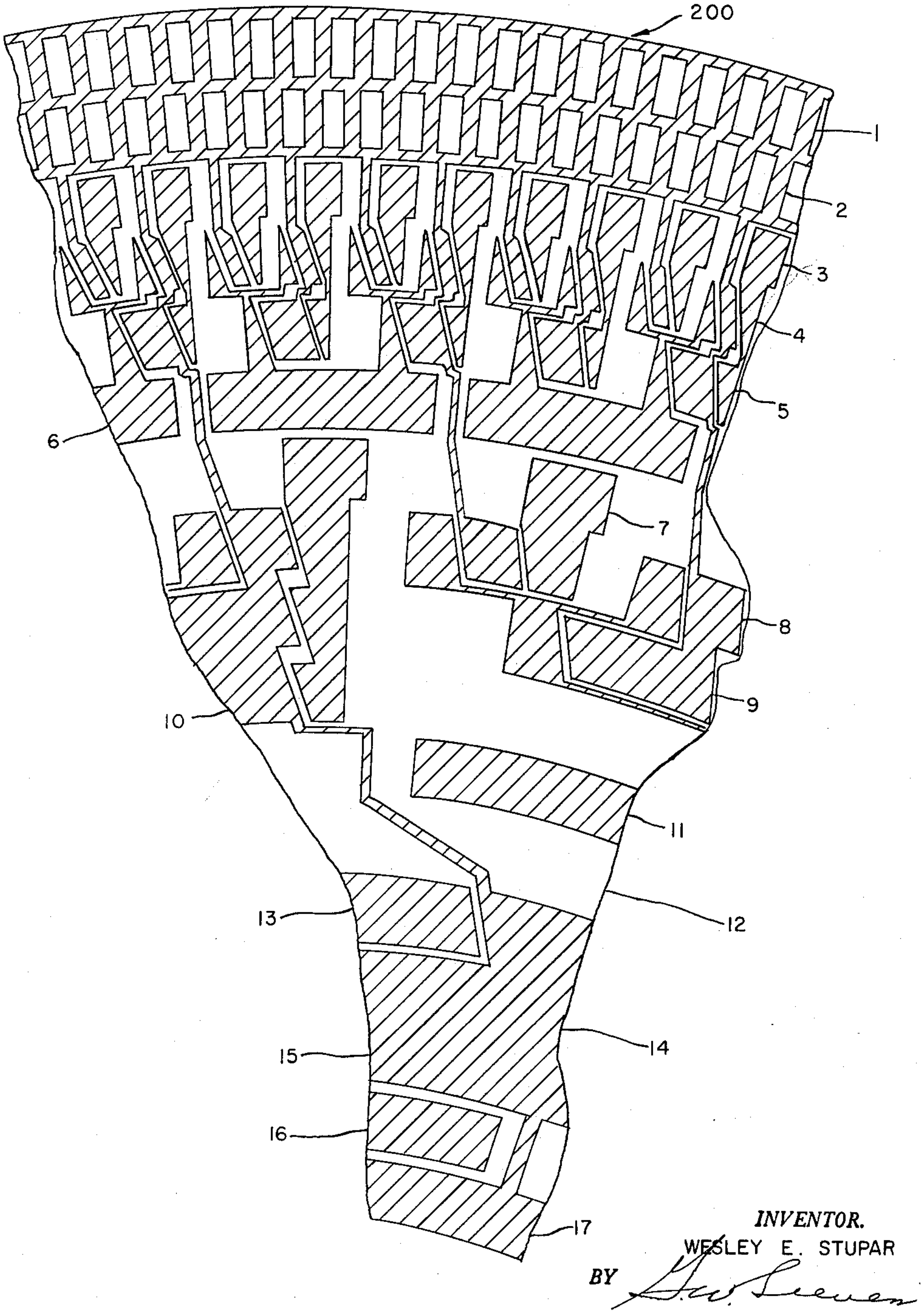
Figure 5:
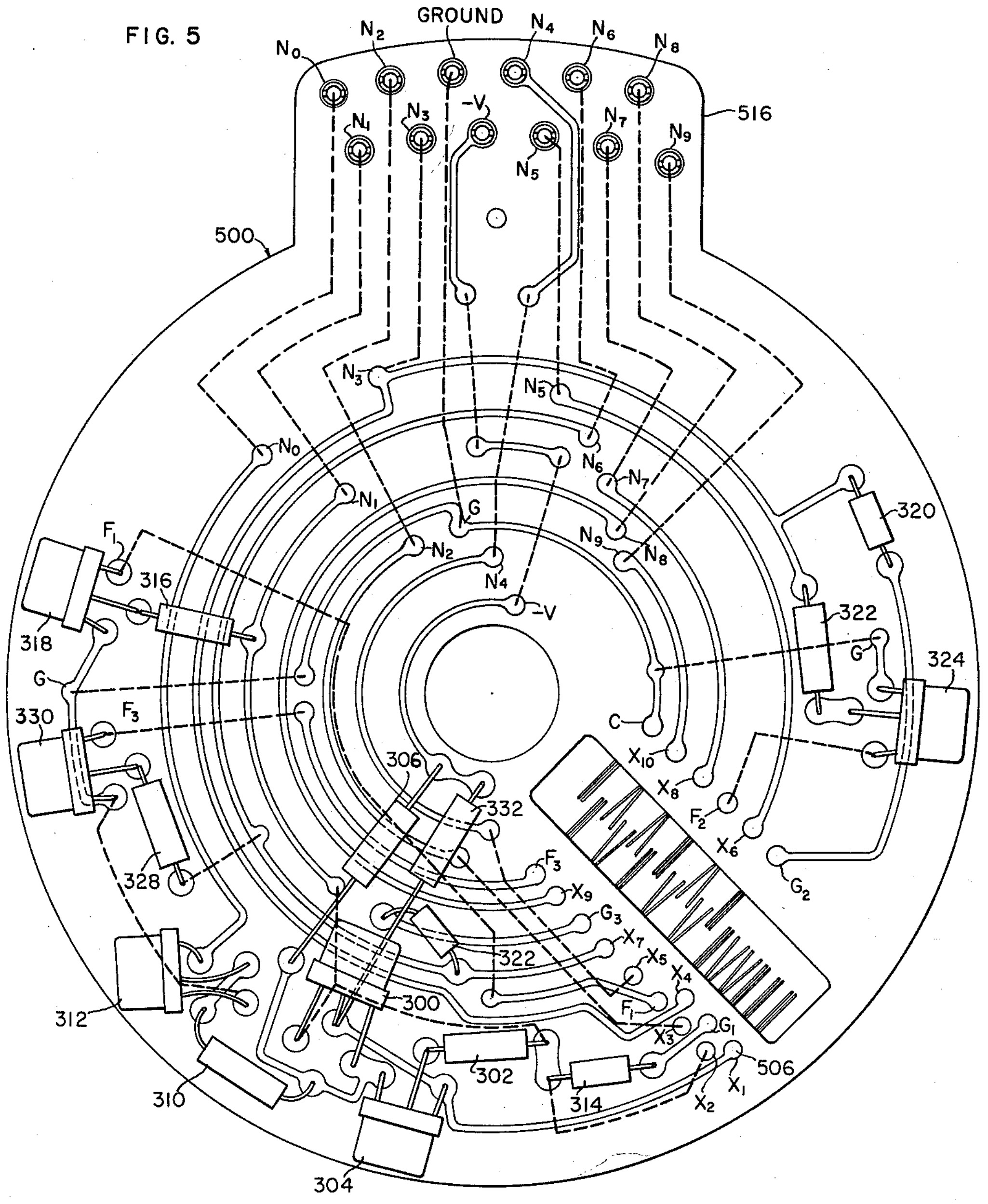
Figure 6:
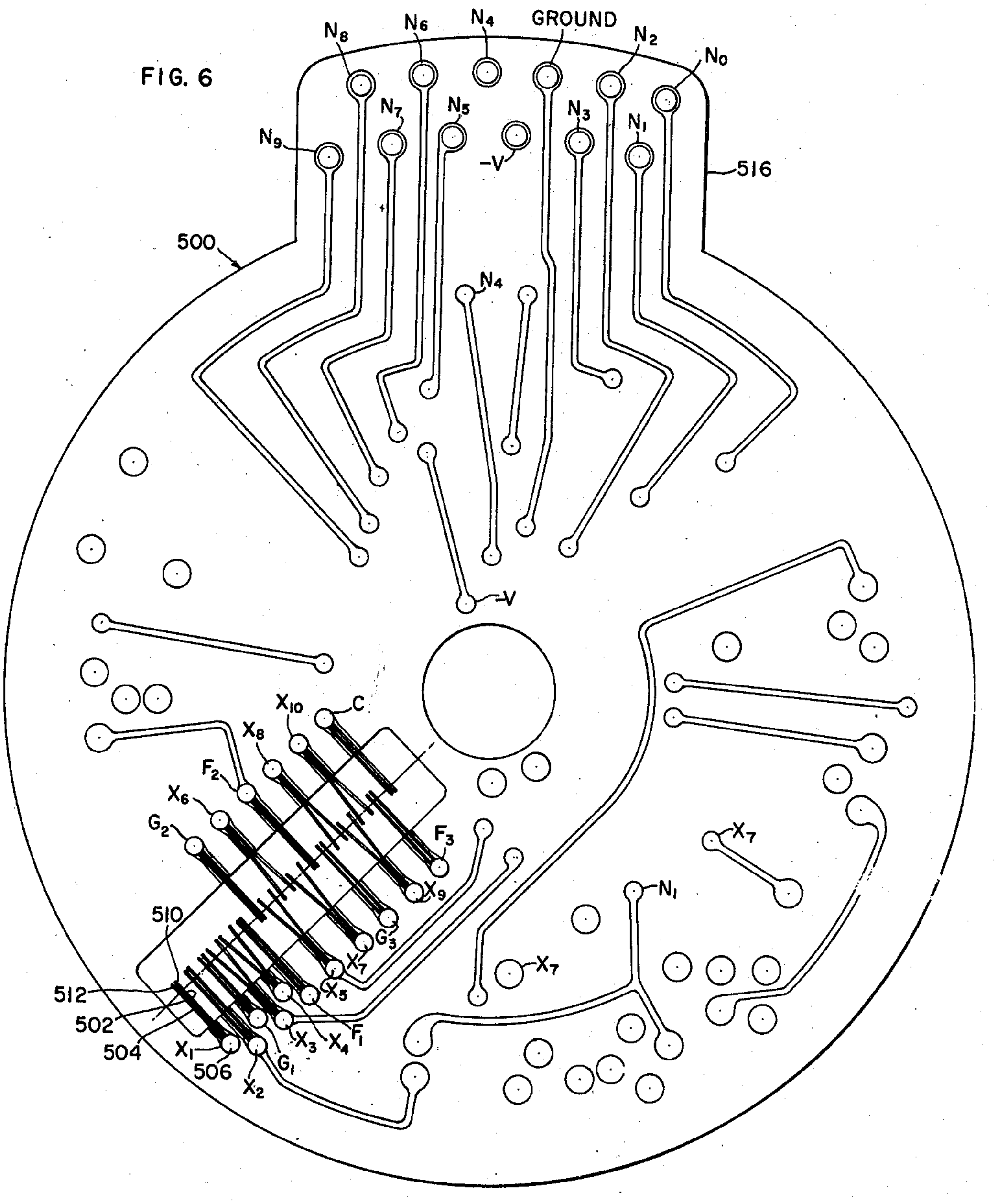

FIGURE 5 is a view of one face of a stationary electrical brush block assembly, this assembly having a printed circuit on both its faces and serving to support the brushes in operative relationship with the respective tracks of rotating commutator disk of FIGURE 1, the assembly also serving to support the various electrical components of the circuitry associated with these brushes and also to support the output terminals of the converter unit;

FIGURE 6 is a view of the opposite face of the brush block assembly, this view showing the various brushes and the manner in which they are supported to make selective electrical contact with the various concentric tracks of the commutator disk of FIGURE 1.

The digitizing commutator disk of the present invention as shown in FIGURE 1 is indicated generally at 200. The conductive portions on the disk are patterned in somewhat the same manner as those of the disk of FIGURE 3 of the Wolman patent cited above, with the exception of the two least significant reading tracks 1 and 2. Also, the disk 200 of the present invention, as noted above, illustrates the gaps between the energized segments and their leading and lagging isolated portions in each of the reading rows as having an oblique separation. As noted above, this permits non-staggering double wire brushes to preserve electrical continuity as they pass from one of these portions to another.

The commutator disk of FIGURE 1 has ten reading tracks to provide a ten-bit resolution (1024 count per revolution) to be obtained. The disk itself may be of the order of 3½ inches in diameter, and as noted above, for such a resolution with the prior art disks described above, disk diameters of the order of 7 inches and more would be required.

The innermost reading track of the disk 200 is designated by the numeral 17, and comprises a continuous conductive segment. The track 16 consitutes a feeding track, and it has a conductive segment extending around a major portion of the conductive segment 17. The track 15 constitutes the most significant reading track, and it has an energized conductive segment extending around substantially half the circumference of the track. The track 15 also has a leading isolated segment (assuming counterclockwise rotation) which is made integral with the conductive segment in the feeding track 16. The reading track 15 also has a trailing isolated segment which is made integral with a lagging segment in the track 14.

The track 14 is a reading track corresponding to the next binary bit in decreasing ordinal significance as compared with the reading track 15. As in the previous embodiments, the track 14 has two energized segments extending through approximately 90°, each of these segments being separated by a nonconductive portion which also extends substantially through 90°. Each of the energized portions of the conductive segments in the track 14 has a lagging isolated portion and a leading isolated portion. Each of the lagging isolated portions is made integral with lagging isolated portions of the conductive segments of the reading track 13. The track 13 constitutes the reading track of the next level in decreasing binary significance as compared with the reading track 14. The track 13 includes four energized conductive segments, each having a lagging isolated segment and each having a leading isolated segment.

The lagging isolated segments in the reading track 13 are made integral with a group of segments in the track 12. This latter track is a feeding track, and it includes four conductive segments which, as stated, are made integral with the lagging segments of the track 13. The conductive segments in the feeding track 12 are spaced equidistantly around the track.

The track 11 is also a feeding track, and it has four conductive segments as shown which are spaced equidistantly from one another and which extend around the track. Each of the conductive segments in the feeding track 11 are connected to the leading segments of the track 10, which is a reading track of the next decreasing significance as compared with the track 13. Each of the energized segments of the reading track 13 is connected to alternate ones of the energized segments in the reading track 10. Each of the lagging isolated segments in the reading track 10 is connected to a lagging isolated segment in a track 9.

The track 9 is a reading track of the next lower significance, as compared with the track 10. This track 9 has a group of energized conductive segments spaced equidistantly around the track. The lagging conductive segments in the reading track 9 are connected to alternate ones of the lagging conductive segments in a track 8.

The track 8 is also a reading track, and it has conductive segments corresponding to the next lower ordinal significance of that track as compared with the track 9. The energized conductive segments of the track 9 are connected to alternate ones of the energized segments in the reading track 8. The lagging segments in the reading track 8 are integral with corresponding segments in the track 7.

The track 7 is a feeding track. The track 6 is also a feeding track, and this latter track comprises a plurality of conductive segments which are connected to pairs of leading conductive segments in the track 5, the track 5 being a reading track. The energized conductive segments in the reading track 8 are connected to alternate ones of the energized segments in the reading track 5.

The track 4 is also a reading track of next lower significance as compared with the track 5, and the energized conductive segments of the track 5 are connected to alternate ones of the energized conductive segments of the track 4. The lagging segments of the reading track 5 are connected to alternate ones of the lagging segments of the track 4. Also, each leading segment in the track 5 is connected to a pair of leading segments in the track 4. Each energized conductive segment in the track 4 is connected to a continuous conductor disposed between the tracks 3 and 2.

In this manner, the energized segments in all the reading tracks obtain their exciting voltage. A conductive path may be traced, for example, from the central segment 17 to the energized conductive segment in the reading track 15 and to the integral energized conductive segments in the reading tracks 14 and 13. A jumper connection connects these integral energized segments to an energized conductive segment in the reading track 10, and this last segment is connected through an energized conductive segment in the track 5 and to an energized conductive segment in the track 4. This latter conductive segment is connected to a conductive segment in the track 4 which, in turn, is connected to the conductor between the tracks 2 and 3. The conductor between the tracks 3 and 2 then completes the connection to all the energized conductive segments in the reading tracks 4, 5, 8, 9, 10, 13, 14 and 15.

Therefore, each reading track has a group of conductive segments that are continuously energized from the central segment, such as the segment 17 in FIGURE 1.

Each of these energized conductive segments, as in the previous embodiment, has a lagging isolated conductive portion and a leading isolated conductive portion. The track 3 constitutes a feeding track, and it includes a group of conductive segments which are respectively connected to the lagging conductive segments of the reading track 4. The leading isolated conductive segments in the reading track 5 are connected to adjacent pairs of the leading conductive segments in the reading track 4. Also, adjacent pairs of the leading conductive segments in the reading track 8 are connected to adjacent ones of the leading conductive segments in the reading track 9. In like manner, adjacent pairs of the leading conductive segments in the reading track 9 are connected to corresponding ones of the leading conductive segments in the reading track 10. The leading segments in the reading track 10 are connected in adjacent pairs to the conductive segments of the feeding track 11, as noted above. The pairs of the leading conductive segments in the reading track 13 are connected to corresponding leading segments in the reading track 14. Likewise, the two leading conductive segments in the reading track 14 are connected to the single leading conductive segment in the reading track 15. The latter leading segment is made integral with the segment in the feeding track 16, as previously noted.

The reason for the complex design and positioning of the conductive segments of the embodiment of FIGURE 1 is that the conductive segments on the disk of FIGURE 1 are digitally allocated and inter-connected to facilitate the energizing of the leading and lagging segments in each of the reading tracks. Thus, the purpose for the connections is so that appropriate leading conductive segments may be energized when the least significant bit undergoes a transition from a non-conductive to conductive state, and so that the lagging segments in each reading track may be de-energized when the least significant bit undergoes a transition from a non-conductive to conductive state.

It will be appreciated that to continue to subdivide each succeeding reading track on the disk of FIGURE 1 to provide a ten bit resolution, for example, would require the conductive segments in a track to decrease in angular length as the number of segments in the track. Similarly, the spacing between conductive segments in the track would correspondingly decrease. Therefore, as described above, should the prior art pattern of the disk of FIGURE 3 of Wolman patent cited above be followed, it might be necessary to extend the diameter of the disk beyond practical limits.

In the embodiment of FIGURE 1, such an extension is rendered unnecessary by the illustrated configuration of the reading rows 2 and 1. These rows constitute the least significant reading tracks on the disk. The reading track 2 consists of a plurality of conductive segments all connected to the conductive ring between the tracks 2 and 3. The conductive segments in the row 2 are twice the number of the energized segments of the next significant reading track 4. However, the segments in the track 2 do not have isolated conductive segments associated with them, and the spacing between them corresponds essentially to the spacing between the segments in the track 4.

Then, in accordance with the present invention, and instead of requiring that the reading track 1 has twice as many conductive segments and half the spacing between them as the reading track 2, the conductive segments of the reading track 1 are made equal in number to those of the reading track 2. The conductive segments of the track 1 are shown as displaced angularly with respect to the conductive segments of the track 1 by an amount corresponding to one-half of the angular lengths of the segments in the tracks 1 and 2. However, the same result could be obtained by aligning the conductive segments in the tracks 1 and 2 and by shifting the brushes associated with one of the tracks by an angular distance corresponding to one half of the angular lengths of the conductive portions in the tracks.

The conductive segments of the track 1 are connected to a conductive annular connecting ring between the tracks 1 and 2, and the conductive segments of the track 2 are connected to this ring and to the ring between the tracks 2 and 3. Therefore, the conductive segments of the tracks are all energized from the central energizing segment 17.

The reading track 1 is disposed at the rim of the disk and the track 2 is disposed adjacent the track 1. These tracks are concentric with one another and with the other tracks. The reading tracks 1 and 2 cooperate to provide indications relating to the least significant binary bit, as noted above, and either the reading track 2 or the reading track 1 provides indications relating to the next least significant binary bit. As noted, the tracks 1 and 2 have a plurality of like positions, with conductive segments being positioned in alternate ones of the positions in each track.

The contact between the brush associated with the track 1 and a conductive segment may be represented as $X_1$, and the contact between that brush and a nonconductive segment may be represented as $\overline{X}_1$. Also, the contact between the brush associated with the track 2 and a conductive segment may be represented as $X_2$, and the contact between that brush and a nonconductive segment may be represented as $\overline{X}_2$. Then the proper output at output terminal $N_0$ for the least significant binary bit may be represented as follows:

$$N_0 = X_1.X_2 + \overline{X}_1.\overline{X}_2 \quad (1)$$

where the dot (.) represents a logical "and" relationship and the plus (+) sign represents a logical "or" relationship. The above logical equation can be realized by three direct coupled P-N-P transistors in a circuit to be described. As a consequence of the staggered arrangement of the tracks 1 and 2, one of these tracks can be used as the unambiguous output for the second-least significant binary bit, as will also be described.

In the illustrated converter of FIGURE 1 embodying my invention, the reading track 2 is used to control the energizing of the lagging isolated conductive segments of the reading tracks 4 and 5 through the feeding track 3, the reading track 5 is used to control the energizing of the lagging segments of the reading tracks 8, 9 and 10 through the feeding track 7, and the reading track 10 is used to control the energizing of the lagging segments of the reading tracks 13, 14 and 15 through the feeding track 12. The control is such that the lagging segments of the controlled reading tracks are energized whenever the contact brush of the controlling track contacts a conductive segment. The reading track 2 is also used to control the leading segments of the reading tracks 3 and 4 through the feeding track 6, the reading track 5 is used to control the leading segments in the reading tracks 8, 9 and 10 through the feeding track 11; and the reading track 10 is used to control the leading segments of the reading tracks 13, 14 and 15 through the feeding track 16. This latter control is such that the leading segments in the controlled tracks are energized whenever the contact brush in the controlling track contacts a non-conductive segment.

The electrical circuitry for the digitizing converter disk of FIGURE 1 is shown in FIGURE 2. In the circuit of FIGURE 2 a series of terminals labelled $X_1$, $X_2$, $X_3$, $X_4$, $X_5$, $X_6$, $X_7$, $X_8$, $X_9$, $X_{10}$, $F_1$, $F_2$, $F_3$, $G_1$, $G_2$, $G_3$ and C are connected to respective electrical contact brushes which, in turn, establish selective contact with the conductive and nonconductive segments in the various tracks on the commutator disk shown in FIGURE 1.

The contact brushes are associated with respective ones of the tracks in the manner shown by the table of FIGURE 3. The reading brushes connected to the terminals $X_1$ and $X_2$ are associated respectively with the reading tracks 1 and 2 of the disk 200 of FIGURE 1. The terminal $X_1$ is connected to the base electrode of a transistor 300, and the terminal $X_2$ is connected to a resistor 302 which, in turn, is connected to the base electrode of a transistor 304. The resistor 302 may have a resistance of, for example, 100 kilo-ohms. The transistors 300 and 304 may be of any known P-N-P type suitable for the particular purpose.

The emitter of the transistor 300 is connected to the terminal $X_2$, and the emitter of the transistor 304 is connected to the terminal $X_1$. The collector electrodes of the transistors 300 and 304 are connected together and to one terminal of a resistor 306. The other terminal of this resistor is connected to the negative terminal of a source of direct voltage 308. The voltage of this source, for example, may have a value of 6 volts, and this source includes a grounded terminal.

The common collector electrodes of the transistors 304 and 300 are also connected to a resistor 310 which is connected to the base of a ground emitter P-N-P transistor 312. The resistor 306 may have a resistance of 5 kilo-ohms and the resistor 310 may have a resistance of 100 kilo-ohms. The collector of the transistor 312 is connected to an output terminal $N_0$ corresponding to the least significant bit.

The terminal $X_2$, to which the second bit reading brush of track 2 is connected, is directly connected to the output terminal $N_1$ at which the binary bit of next increasing significance appears. The terminal $X_2$ is also connected to the anode of an isolating diode 314, the cathode of this diode being connected to a terminal $G_1$. The terminal $G_1$ is connected to the feeding brush associated with the feeding track 3 of the disk of FIGURE 1. The purpose of the diode 314 is to prevent the feeding track 3 from ever affecting the controlling track 2. The terminal $X_2$ is also connected to a 100 kilo-ohm resistor 316 which, in turn, is connected to the base of a grounded emitter P-N-P transistor 318. The transistor 318 functions as an inverter, and its collector is connected to the terminal $F_1$. The terminal $F_1$ is connected to the feeding brush associated with the feeding track 6 of the commutator disk of FIGURE 1.

The terminal $X_3$ is connected to the reading brush associated with the reading track No. 4 on the disk 200, and this terminal is directly connected to the output terminal labelled $N_2$. The binary bit of the third significant level appears at the latter output terminal. In like manner, the terminal $X_4$ is connected to the brush associated with the reading track 4, on the digitizing disk and this latter terminal is connected to the output terminal $N_3$, the binary bit of the fourth significant level appearing at the latter output terminal.

As previously stated, the binary bit of the track 5 is a controlling bit, and the terminal $X_4$ is connected through an isolating diode 320 to a terminal $G_2$, this latter terminal being connected to the brush associated with the feeding track 7. The terminal $X_4$ is also connected to a resistor 322 of, for example, 100 kilo-ohms, and this resistor is connected to the base electrode of a grounded emitter P-N-P transistor 324. This transistor, like the transistor 318, serves as an inverter and its collector electrode is connected to the terminal $F_2$ connected to the brush associated with the feeding track 11.

In like manner, terminals $X_5$ and $X_6$ are connected respectively to the brushes associated with the reading tracks 8 and 9, and these terminals are directly connected to corresponding output terminals $N_4$ and $N_5$. The binary bits of the next two higher significant levels appear at these latter output terminals. Likewise, the terminal $X_7$ is connected to the brush associated with the reading track 10 and this terminal is directly connected to the output terminal $N_6$.

The bit of the reading track 10 controls the leading and lagging segments in the tracks 13, 14 and 15, as noted above. Therefore, the terminal $X_7$ is connected to an isolating diode 326 and through a resistor 328 to the base electrode of an inverting P-N-P grounded emitter transistor 330. The resistor 328 may, for example, have a resistance of 100 kilo-ohms. The cathode of the diode 326 is connected to an output terminal $G_3$ which is connected to the brush associated with the feeding track 12, and the collector electrode of the transistor 330 is connected to the terminal $F_3$ connected to the brush associated with the feeding track 16.

The terminals $X_8$, $X_9$ and $X_{10}$ are connected to respective ones of the brushes associated with the reading tracks 13, 14 and 15. These terminals are directly connected to respective ones of the output terminals $N_7$, $N_8$, $N_9$. Finally, the terminal C which is connected to the brush associated with the continuous track 17 is connected to ground. A resistor 332 is connected between the —V source of current 308. Also any suitable resistors (not shown in FIGURES 5 and 6) 334, 336, 338, 340, 342, 344, 346, 348, 350 and 352 are connected between the —V source of current 308 and output terminals $N_0$, $N_1$, $N_2$, $N_3$, $N_4$, $N_5$, $N_6$, $N_7$, $N_8$ and $N_9$ respectively, as shown in FIGURE 2. In order to facilitate a better understanding of the direction of flow of current from the converter disc 200 into the contact brushes $X_1$ through $X_{10}$, inclusive, $F_1$, $F_2$, $F_3$, $G_1$, $G_2$, $G_3$ and C arrows associated therewith have been shown, in FIGURE 2, directed toward or from a symbolic representation of the disc 200 in the direction of flow of said current.

As the commutator disk of FIGURE 1 rotates in the counterclockwise direction, the various brushes associated with the different reading tracks on the disk make selective contact with the conductive and nonconductive segments in the manner described above, and the various signal representations developed by these brushes are directly introduced through a parallel readout to the respective output terminals. Whenever a brush contacts a nonconductive segment it exhibits a potential equivalent to (—V), the potential of the source 308. Whenever a brush contacts a conductive segment, however, it is short circuited to ground by the connections to the grounded track 17. With the exception of the least significant bit, the connections between the brushes and their corresponding output terminals are direct.

The brush associated with the feeding track 3 is energized only when the brush in the reading track 2 engages a conductive segment. This causes the lagging segments in the reading tracks 4 and 5 to be energized at the moment of transition of that brush from nonconductive to conductive segments in the reading track 2 and to be deenergized at the transition of the brush from conductive to nonconductive segments in that reading track. Likewise, the brush associated with the feeding track 6 is energized at the transition of the brush in the reading track 2 from conductive to nonconductive segments in the reading track 2, because of the phase inverter circuit of the transistor 318. The brush in the feeding track 6 is de-energized for transitions of the brush in the reading row 2 between nonconductive and conductive segments. The segments of the feeding track 6 are connected to the leading segments in the reading tracks 4 and 5. These leading segments are energized, therefore, for transitions of the brush in the track 2 between conductive and nonconductive segments. Likewise, these leading segments are deenergized for transitions of that brush between nonconductive and conductive segments in the track 2.

In precisely the same manner, the brush of the reading track 4 controls the leading and lagging segments of the reading tracks 8, 9 and 10 through the brushes associated with the feeding tracks 7 and 11. Likewise, the brush associated with the reading track 10 controls the leading and lagging segments of the reading tracks 13, 14 and 15 through the brushes associated with the feeding tracks 12 and 16.

Insofar as the reading tracks 2, 4, 5, 8, 9, 10, 13, 14 and 15 are concerned, the operation of the disk of FIGURE 1 is very much like the operation of the prior art digitizing disks shown and described in the Wolman patent cited above. The control is such that the count for any of the reading tracks is made under the indirect control of the track 2 and only at the precise moment of a transition in that track. As described above, the energizing of the leading and lagging segments in the reading tracks 4 and 5 is controlled in the proper manner by the transitions in the reading track 2. Likewise, the energizing of the leading and lagging segments in the reading tracks 8, 9 and 10 is controlled by the transitions in the reading track 5, which, in turn, are controlled by the transitions in the reading track 2. Also, the energizing of the leading and lagging segments in the reading tracks 13, 14 and 15 is under the control of the transitions in the reading track 10. These latter transitions are controlled by the reading track 5, which, as noted, has its transitions controlled by the track 2.

The control of the least significant bit through the circuit of the transistors 300, 304 and 312 may best be explained by first considering the fragmentary transistor circuit of FIGURE 4. The grounded emitter circuit of FIGURE 4 includes a transistor 400. A resistor 402 is connected between the base of the transistor and a terminal B. The emitter of the transistor is connected to a terminal A, which may be grounded at times. The collector of the transistor is connected to a terminal C, and the collector is further connected to one terminal of a resistor 404. The other terminal of the resistor 404 is connected to the negative terminal of a voltage source, this negative terminal being represented by the designation —V.

The potential at the terminals A, B and C may be considered to represent the binary designation "1" when they are nearer ground potential. In like manner, these terminals may be considered to represent the binary designation "0" when they are nearer the —V potential. Under such conditions the following is true:

$$C=A\overline{B} \qquad (2)$$

where $C$=a ground potential at the collector;
$A$=a ground potential at the emitter;
$\overline{B}$=a potential of —V at the base; and
The dot (.) represents an "and" relationship.

This may be seen from the fact that the transistor 400 becomes conductive when a negative potential is introduced to the base of the transistor. When the transistor 400 becomes conductive, the potential drop between the emitter and the collector of the transistor becomes relatively low. This causes the terminal C to have essentially a ground potential.

Similarly, the transistor 400 remains nonconductive when a ground potential is introduced to its base at the same time that the emitter of the transistor is grounded. The transistor 400 also remains nonconductive upon the introduction of corresponding negative potential to the base and the emitter of the transistor. Since the transistor 400 is nonconductive, the collector of the transistor has a potential of —V. This causes the following relationship to be obtained:

$$\overline{C}=\overline{A}.\overline{B}+A.B \qquad (2a)$$

where the plus sign (+) represents an "or" relationship.

Therefore, in the circuit of the transistors 300 and 304 in which the emitter of the transistor 300 is returned to the terminal, $X_2$ and the emitter of the transistor 304 is returned to the terminal $X_1$, the potential at the common collectors can be expressed as:

$$C'=X_1.\overline{X}_2+\overline{X}_1.X_2 \qquad (3)$$
$$\overline{C}'=X_1.X_2+\overline{X}_1.\overline{X}_2 \qquad (4)$$

where $C'$=a ground potential at the common collectors;
$\overline{X}_1$=a potential of —V at the terminal $X_1$;
$X_2$=a ground potential at the terminal $X_2$;
$X_1$=a ground potential at the terminal $X_1$;
$\overline{X}_2$=a potential of —V at the terminal $X_2$;
$C'$=a ground potential at the common collectors; and
$\overline{C}'$=a potential of —V at the common collectors.

In like manner, the potential at the output terminal $N_0$ corresponds to the potential at the collector of the transistor 312. This latter potential may be expressed as follows:

$$N_0=A'.\overline{B}' \qquad (5)$$

where $N_0$=a ground potential at the output terminal $N_0$;
$A'$=a ground potential at the emitter of the transistor 312;
$\overline{B}'$=a potential of —V at the base of the transistor 312;

However, $$\overline{B}'=\overline{C}'=X_1.X_2+\overline{X}_1.\overline{X}_2 \qquad (6)$$

Therefore:

$$N_0=A'.(X_1X_2+\overline{X}_1\overline{X}_2) \qquad (7)$$

This can be simplified to:

$$N_0=X_1X_2+\overline{X}_1\overline{X}_2 \qquad (8)$$

since A' represents a fixed ground potential.

The logic set forth in the previous paragraphs may be seen on a practical basis from the following discussion. For each conductive portion in the track 2, the track 1 also has a conductive portion for half of the angular length and has a nonconductive portion for the other half of the conductive length. Thus, a coincidence of conductive portions in the tracks 1 and 2 may be considered to represent a binary "1" and the occurrence of a conductive portion for one of the tracks may be considered to represent a binary "0." Just as a coincidence between conductive portions in the tracks 1 and 2 may be considered to represent a binary "1," a coincidence between nonconductive portions in the tracks 1 and 2 may also be considered to represent a binary "1."

Therefore, an output pulse is developed at the terminal $N_0$ whenever both of the brushes associated with the tracks 1 and 2 contact a conductive segment or when neither of the brushes associated with these tracks contacts a conductive segment. Because of the off-set relation between the conductive segments in these two tracks, twice as many pulses are developed as there are segments in either of the tracks so that double spacing between the segments is effectively possible. Moreover, the contact provided by the brush associated with the reading track 2 changes from a nonconductive to a conductive segment at the precise instant that the signal at the terminal $N_0$ changes from an $\overline{X}_1.\overline{X}_2$ binary "1" condition to an $\overline{X}_1.X_2$ binary "0" condition; and the contact provided by the brush changes from a conductive to a nonconductive segment at the precise instant that the signal at the terminal $N_0$ changes from an $X_1.X_2$ binary "1" condition to an $X_1.\overline{X}_2$ binary "0" condition. Therefore, a nonambiguous reading of the second least significant binary bit may be obtained at the terminal $N_1$, which is connected to the brush associated with the track 2.

Then, the binary bit of the track 2 controls the reading tracks 4 and 5 through the feeding tracks 3 and 6, as mentioned above. Likewise, the reading track 5 controls the reading tracks 8, 9 and 10 through the feeding tracks 7 and 11. Likewise, the reading track 10 controls the reading tracks 13, 14 and 15 through the feeding tracks 12 and 16. Therefore, the entire disk is controlled for non-ambiguous readings through ten binary bits in the illustrated example.

As shown in FIGURES 5 and 6 the various brushes associated with the different tracks of the disk of FIGURE 1 may be supported on a stationary brush block 500. These brushes are labelled $X_1$, $X_2$, $G_1$, $X_3$, $X_4$, $F_1$, $G_2$, $X_5$, $X_6$, $X_7$, $F_2$, $G_3$, $X_8$, $X_9$, $X_{10}$, $F_3$ and C in FIGURE 6 in conformance with the table of FIGURE 3. The brush holder 500 is composed of a suitable insulating material composed, for example, of a melamine resin. The various connections of the circuit of FIGURE 2 are imprinted on both sides of the disk in accordance with known photo-etched or other suitable techniques. Moreover, all the transistors and resistors of the circuit of FIGURE 2 are supported directly on the brush block as shown, for example, in FIGURES 5 and 6.

The brushes as shown in FIGURE 6, each comprise a pair of electrically conductive resilient fingers such as the fingers 502 and 504 of the brush $X_1$ (FIGURE 6). These fingers are riveted to the brush block assembly 500 by a common electrically conductive rivet 506 to which a soldered electric contact may be made or which may directly contact the proper conductor of the etched circuit.

As shown in FIGURES 5 and 6, a radially extended portion 516 of the brush block serves to support the terminals $N_0$, $N_1$, $N_2$, $N_3$, $N_4$, $N_5$, $N_6$, $N_7$, $N_8$, $N_9$, $-V$ and ground.

In operation, the terminals $N_0$, $N_1$, $N_2$, $N_3$, $N_4$, $N_5$, $N_6$, $N_7$, $N_8$ and $N_9$ become grounded to a common terminal for a binary "1" and these terminals are disconnected for a "0" period. An operating voltage of $-6$ volts provides a maximum current of 1.2 milliamperes per brush. The usual inexpensive 6-volt P-N-P type germanium transistors, such as those presently designated as IN67 have been found to be feasible for the operation of the unit. The maximum speed of rotation of the converter is, of course, dependent upon the life and contact noise requirements. Preliminary tests have indicated that an input shaft speed of 25 r.p.m. is reasonable at which speed a life of about $10^6$ revolutions can be expected.

The invention provides, therefore, an improved analogue-to-digital converter in which extremely high resolution is possible without a corresponding increase in the size of the digitizing commutator disk beyond practical limits.

As used in the claims, the terms "conductive" and non-conductive" portions or segments are intended to cover a number of equivalent situations. For example, such terms are intended to cover an information member having raised and lowered portions such that the brushes will contact only the raised portions to produce first signals and will not contact the lowered portions to produce second signals. When the segments in one row are mentioned in the claims as being displaced from the segments in a second row, equivalent situations are intended to be covered. For example, such displacements could be obtained not only by shifting the segments but also by shifting the brushes which are coupled to the rows. As used in the claims, the terms "switching means," "receiving means" and "brushes" are intended to cover any structure which is able to read signals from the disc to represent differences between "conductive" and "non-conductive" segments on the disc.

It is to be understood that changes in shape, size, material, and the like, may be resorted to without departing from the spirit of my invention as set forth in the following claims.

I claim:

1. An analogue-to-digital converter, including, a digitizing commutator disk rotatable to different positions respectively representing different analogue quantities, a first annular track on said disk with alternate conductive and nonconductive segments of approximately equal length, a second annular track on said disk with alternate conductive and nonconductive segments of approximately equal length, said second track being concentric with said first track and angularly displaced with respect thereto by an amount corresponding to one-half of one position, a first electrical brush positioned to engage successive segments in said first track upon rotary movement of the disk relative to the brush, a second electrical brush positioned in radial alignment with said first brush to engage successive segments in said second track upon rotary movement of the disk relative to the brush, and means including a plurality of "and" networks and "or" networks connected in a particular interrelationship and responsive to the signals from the first and second brushes to produce a first signal upon the occurrence of signals of like characteristics from the first and second brushes and to produce a second signal upon the occurrence of signals of opposite characteristics from the first and second brushes to obtain signals alternating at a frequency twice as great as the frequency of the alternating signals produced in the first and second brushes upon progressive displacements between the disk and the brushes.

2. An analogue-to-digital converter, including, an information member having conductive and nonconductive segments arranged on the member in a plurality of rows of different ordinal significance, one pair of the rows in the plurality having conductive and nonconductive segments of equal lengths and having the segments in one row staggered with respect to the segments of the other row and having the conductive segments connected to receive an energizing potential, the other rows in the plurality having first electrically conductive segments connected to receive the energizing potential and having auxiliary electrically conductive segments disposed adjacent to the ends of respective ones of said directly energized segments but electrically insulated therefrom, a plurality of brushes electrically coupled to the segments in the different rows in the plurality, and means including a plurality of "and" networks and "or" networks responsive to the signals from the brushes electrically coupled to the particular pair of rows and coupled electrically to one another in particular relationships to produce first signals upon the occurrence of signals of similar characteristics from these brushes and to produce second signals different from the first signals upon the occurrence of signals of dissimilar characteristics from these brushes for the alternate production of the first and second signals at a frequency higher then the signals produced by the brushes, particular ones of the brushes being disposed relative to the conductive segments in the associated rows in the plurality to obtain a direct energizing of these brushes and being coupled to the auxiliary segments in other rows to obtain an energizing of these segments through these energized brushes and to obtain an energizing of selective ones of the remaining brushes in the rows other than the particular pair through the energized auxiliary segments for the simultaneous production by the brushes in the plurality of a plurality of signals in accordance with the positioning of the information member, the auxiliary conductive segments being coupled to a selected one of the brushes associated with the particular pair of rows to obtain an energizing of these segments in accordance with the energizing of the selected brush.

3. An analogue-to-digital converter, including, an information member having conductive and nonconductive segments alternately disposed on the member in rows of different ordinal significance and having the conductive and nonconductive segments of equal length in a particular pair of rows with the segments in one of the rows in the pair being displaced from the segments in the other of the rows in the pair by a distance equal to substantially one half of the lengths of the segments in the rows, the conductive segments in the different rows in the plurality being connected to be directly energized, a first plurality of auxiliary conductive segments electrically isolated from the directly energized segments and disposed in leading relationship to the directly energized segments in the different rows other than the rows in the particular pair, a second plurality of auxiliary conductive segments electrically isolated from the directly energized segments and disposed in lagging relationship to the directly energized segments in the different rows other than the rows in the particular pair, a plurality of output brushes disposed in coupled relationship to the conductive and nonconductive segments in the different rows to provide signals in accordance with their disposition relative to the segments in the rows at any instant, means including electrical circuitry responsive to the signals produced by the brushes coupled to the particular pair of rows for comparing these signals to obtain the production of first signals upon the simultaneous disposition of the brushes relative to segments of similar characteristics of conductivity in the coupled rows and to produce second signals different from the first signals upon the simultaneous disposition of the brushes relative to segments of dissimilar characteristics of conductivity in the coupled rows for the alternate production of the first and second signals to represent a digit of less digital significance than the signals produced by the brushes coupled to the rows in the particular pair, and means including a plurality of auxiliary brushes coupled to a selected one of the output brushes in the pair of rows for energizing particular lagging conductive segments upon a coupled relationship between the selected one of the output brushes in the particular pair of rows and the conductive segments in the associated row and for energizing particular leading conductive segments upon a coupled relationship between the selected output brush and the nonconductive segments in the coupled row to obtain an energizing of the output brushes in accordance with the disposition of the information member and in digital representation of such disposition.

4. An analogue-to-digital converter, including, a digitizing commutator disk rotatable to different positions respectively representing different analogue quantities, a plurality of concentric annular reading tracks disposed on said disk each having digitally allocated conductive and nonconductive segments therein in alternating relationship and each representing a binary bit of a different significance, each of said conductive segments in each of said tracks having an isolated conductive trailing portion and an isolated conductive leading portion, a plurality of feeding tracks disposed on said disk concentric with said reading tracks to control the excitation of said leading and trailing portions in respective ones of said reading tracks, a pair of additional annular reading tracks of like resolution disposed on said disk in concentric relationship with said plurality of reading tracks and having conductive and nonconductive segments of equal lengths and disposed in alternate relationship to one another in each row and having the segments in one track displaced from the segments in the other track by a particular distance related to the lengths of the segments in the tracks, a plurality of brushes each disposed in coupled relationship to a different one of the tracks in the plurality to produce signals in accordance with the disposition of the brushes relative to the conductive and nonconductive segments in the associated track, the brushes in the plurality being coupled to one another in a particular relationship to obtain an energizing of selected brushes in the reading tracks in accordance with the energizing of the brushes in the feeding tracks, and means including electrical circuitry coupled to the brushes in the pair of additional reading tracks to obtain the production of first signals upon the production of signals of like characteristics by such brushes and to obtain the production of second signals different from the first signals upon the production of signals of dissimilar characteristics by such brushes and to obtain the alternate production of first and second signals at a frequency higher than the signals from such brushes to represent the value of a digit of least significance, the isolated conductive trailing and leading portions in the different tracks being energized in accordance with the disposition of the brushes in a selected one of the additional tracks relative to the segments in that track.

5. An analogue-to-digital converter, including, a digitizing commutator disk rotatable to different positions respectively representing different analogue quantities, a plurality of concentric annular reading tracks disposed on said disk each having digitally allocated conductive segments therein and each representing a binary bit of a different significance, each of said conductive segments in each of said tracks having an isolated conductive trailing portion and an isolated conductive leading portion, a plurality of feeding tracks disposed on said disk in concentric relationship with said reading tracks and having conductive segments interconnected with the leading and trailing portions therein to control the excitation of said leading and trailing portions in respective ones of said reading tracks, a first additional reading track disposed on said disk concentric with said plurality of reading and feeding tracks and surrounding the same to represent the second least significant binary bit, a second additional reading track disposed on said disk concentric with said plurality of reading and feeding tracks and in adjacent relationship to said first additional reading track, said second additional track having like resolution as said first additional track and being offset angularly with respect thereto by an amount corresponding to one-half of one position on said additional tracks, a plurality of brushes positioned to successively engage respective ones of said reading and feeding tracks, the brushes in the plurality being coupled electrically to a selected one of the brushes in the first and second additional tracks to obtain an energizing of particular conductive segments in the feeding tracks and particular ones of the isolated leading conductive portions or particular ones of the isolated trailing conductive portions in accordance with the disposition of the selected brush relative to the conductive and nonconductive segments in the associated one of the aditional tracks, and means including a plurality of "and" networks connected to said brushes engaging said first and second additional tracks and "or" networks connected to said "and" networks for the production of first signals upon the simultaneous engagement by the brushes of conductive segments or the simultaneous engagement by the brushes of nonconductive segments and for the production of second signals at other times to obtain the production of signals representing the least significant digit.

6. An analogue-to-digital converter, including, an information member, a first track of a selected resolution having alternate conductive and nonconductive segments disposed on said information member, a second track of like resolution having alternate conductive and nonconductive segments disposed on said information member, a first brush for successively contacting said segments in said first track, a second brush for successively contacting said segments in said second track, said first and second tracks being offset with respect to said first and second brushes by a distance corresponding to one half of the lengths of the segments in the track, a first semiconductor having a collector and a base connected to said first brush and having an emitter connected to said second brush, a second semiconductor having a collector connected to said collector of said first transistor and having a base connected to said second brush and having an emitter connected to said first brush, means coupled electrically to the collectors of the first and second semiconductors for providing the collectors with a direct exciting potential, a third semi-conductor having a base connected to the collectors of said first and second semiconductors and having an emitter connected to receive a reference potential and having a collector, a first output terminal connected to the collector of the third semiconductor, and a second output terminal connected to the second brush.

7. An analog-to-digital converter, including, an information member having electrically conductive segments arranged on the member in rows of different ordinal significance and having nonconductive segments arranged on the member between the conductive segments, a first pair of the rows having the conductive and nonconductive segments disposed in alternate relationship and provided with equal lengths and disposed with the segments in a first row in the pair offset by a particular distance with respect to the segments in the second row in the pair, a plurality of auxiliary electrically conductive segments disposed adjacent respective ones of said first mentioned segments but insulated therefrom in the rows other than the particular pair, means including a plurality of switching means each electrically coupled to a different one of said rows for the production of output signals in accordance with the disposition of the switching means relative to the different segments in the rows and in accordance with the disposition of the switching means relative to the segments in a selected one of the rows in a particular pair and for the production of signals by each switching means simultaneously with the production of signals by the other switching means, first and second switching means in the plurality being respectively coupled electrically to the segments in the first and second rows in the pair, a first semiconductor having a collector and a base coupled electrically to the first switching means and having an emitter coupled electrically to the second switching means, a second semi-conductor having a collector coupled electrically to the collector of the first semiconductor and having a base coupled electrically to the second switching means and having an emitter coupled electrically to the first switching means, means coupled electrically to the collectors of the first and second semi-conductors for providing the collectors with a direct exciting potential, a third semi-conductor having a base coupled electrically to the collectors of the first and second semi-conductors and having an emitter coupled electrically to receive a reference potential and having a collector, a first output terminal coupled electrically to the collector of the third semi-conductor, and a second output terminal coupled electrically to the second switching means, the auxiliary conductive segments being energized in accordance with the energizing of a selected one of the first and second switching means in the plurality and particular ones of the switching means in the plurality being energized in accordance with the energizing of the auxiliary conductive segments, and a plurality of additional output terminals respectively coupled electrically to different ones of said switching means in the plurality to indicate the signals simultaneously produced by the switching means.

8. An analog-to-digital converter, including, an information member having conductive and nonconductive segments alternately disposed on the member in rows of different ordinal significance and having the conductive and nonconductive segments of equal length in a particular pair of rows with the segments in a first one of the rows being displaced from the segments in the second one of the rows in the pair by a distance equal to substantially one half of the lengths of the segments in the rows, the conductive segments in the different rows in the plurality being connected to be directly energized, a first plurality of auxiliary conductive segments electrically isolated from the directly energized segments and disposed in leading relationship to the directly energized segments in the different rows other than the rows in the particular pair, a second plurality of auxiliary conductive segments electrically isolated from the directly energized segments and disposed in lagging relationship to the directly energized segments in the different rows other than the rows in the particular pair, a plurality of output brushes disposed in coupled relationship to the conductive and nonconductive segments in the different rows to produce signals in accordance with their disposition relative to the segments in the rows at any instant, first and second particular brushes in the plurality being respectively disposed in coupled relationship to the first and second rows in the pair, a first semi-conductor having a collector and a base coupled electrically to the first particular brush in the plurality and having an emitter coupled electrically to the second particular brush in the plurality, a second semi-conductor having a collector coupled electrically to the collector of the first semi-conductor and having a base coupled electrically to the second particular brush in the plurality and having an emitter coupled electrically to the first particular brush in the plurality, means coupled electrically to the collectors of the first and second semiconductors for providing the collectors with a direct exciting potential, a third semi-conductor having a base coupled electrically to the collectors of the first and second semi-conductors and having an emitter coupled electrically to receive a reference potential and having a collector, a first output terminal coupled electrically to the collector of the third semi-conductor, a second output terminal coupled electrically to the second semi-conductor, and means including a plurality of auxiliary brushes coupled electrically to a selected one of the first and second particular output brushes in the plurality for energizing particular lagging conductive segments upon a coupled relationship between the selected one of the first and second particular output brushes and the conductive segments in the associated row and for energizing particular leading conductive segments upon a coupled relationship between the selected output brush and the nonconductive segments in the coupled row and to obtain an energizing of particular ones of the output brushes in the plurality in accordance with the energizing of the leading or lagging segments and to obtain an energizing of the output brushes in the plurality in accordance with the disposition of the information member relative to the brushes and in digital representation of such disposition.

9. An analogue-to-digital converter, including a digitizing commutator disk rotatable to different positions respectively representing different analogue quantities, a first annular track on said disk with segments having first particular electro-magnetic properties alternating with segments having second particular electro-magnetic properties, a second annular track on said disk, said second track being concentric with said first track and angularly displaced with respect thereto by an amount corresponding to one-half of the length of one segment, a first sensing element positioned to be coupled to successive segments in said first track upon rotary movement of the disk relative to the sensing element, a second sensing element positioned in radial alignment with said first sensing element and adapted to be coupled to successive segments in said second track upon rotary movement of the disk relative to the sensing element, and means including a plurality of "and" networks and "or" networks connected in a particular interrelationship and responsive to the signals from first and second sensing elements to produce a first signal upon the occurrence of signals of like characteristics from the first and second sensing elements and to produce a second signal upon the occurence of signals of opposite characteristics from the first and second sensing elements to obtain signals alternating at a frequency twice as great as the frequency of the alternating signals produced in the first and second sensing elements upon progressive displacements between the disk and the sensing elements.

10. An analogue-to-digital converter including a digitizing commutator disk rotatable to different positions respectively representing different analogue quantities, a first annular track on said disk with alternate conductive and non-conductive segments of approximately equal length, a second annular track on said disk with alternate conductive and non-conductive segments of approximately equal length, said second track being concentric with said first track, a first electrical brush positioned to engage successive segments in said first track upon rotary movement of the disk relative to the brush, a second electrical brush positioned in radial alignment with said first brush to engage successive segments in said second track upon rotary movement of the disk relative to the brush, said second brush being angularly displaced from said first brush by an amount corresponding to one-half of the length of one segment, and means including a plurality of "and" networks and "or" networks connected in a particular interrelationship and responsive to the signals from the first and second brushes to produce a first signal upon the occurrence of signals of like characteristics from the first and second brushes and to produce a second signal upon the occurrence of signals of opposite characteristics from the first and second brushes to obtain signals alternating at a frequency twice as great as the frequency of the alternating signals produced in the first and second brushes upon progressive displacements between the disk and the brushes.

References Cited in the file of this patent

UNITED STATES PATENTS

| | | |
|---|---|---|
| 2,659,072 | Coales | Nov. 10, 1953 |
| 2,685,082 | Beman | July 27, 1954 |
| 2,750,584 | Goldfischer | June 12, 1956 |
| 2,765,459 | Winters | Oct. 2, 1956 |
| 2,766,446 | Bland | Oct. 9, 1956 |
| 2,835,829 | Sourgens et al. | May 20, 1958 |
| 2,866,184 | Grey | Dec. 23, 1958 |
| 2,880,410 | Postman | Mar. 31, 1959 |
| 2,907,020 | Champion | Sept. 29, 1959 |
| 2,977,582 | Wolman | Mar. 28, 1961 |
| 3,030,617 | Chase | Apr. 17, 1962 |